(12) United States Patent
Strandjord

(10) Patent No.: US 7,864,328 B2
(45) Date of Patent: Jan. 4, 2011

(54) DETERMINATION OF OPTIMUM MODULATION AMPLITUDE TO SUPPRESS MODULATION-DISTORTATION-INDUCED ROTATION SENSING ERRORS IN A FIBER OPTIC GYROSCOPE

(75) Inventor: Lee Strandjord, Tonka Bay, MN (US)

(73) Assignee: Honeywell International Inc., Morristown, NJ (US)

( * ) Notice: Subject to any disclaimer, the term of this patent is extended or adjusted under 35 U.S.C. 154(b) by 133 days.

(21) Appl. No.: 12/413,304

(22) Filed: Mar. 27, 2009

(65) Prior Publication Data

US 2010/0245834 A1    Sep. 30, 2010

(51) Int. Cl.
G01C 19/72 (2006.01)
(52) U.S. Cl. ...................................... 356/461
(58) Field of Classification Search ............... 356/461, 356/463
See application file for complete search history.

(56) References Cited

U.S. PATENT DOCUMENTS

| | | | |
|---|---|---|---|
| 5,296,912 A | | 3/1994 | Strandjord et al. |
| 5,351,252 A | * | 9/1994 | Toyama et al. .......... 372/29.021 |
| 5,363,195 A | * | 11/1994 | Ward et al. .................. 356/463 |
| 5,537,671 A | * | 7/1996 | Toyama et al. ................ 385/27 |
| 6,014,217 A | * | 1/2000 | Sanders et al. .............. 356/461 |
| 2010/0002239 A1 | * | 1/2010 | Strandjord et al. .......... 356/461 |
| 2010/0198518 A1 | * | 8/2010 | Ekseth et al. .................. 702/6 |

* cited by examiner

Primary Examiner—Patrick J Connolly
(74) Attorney, Agent, or Firm—Fogg & Powers LLC

(57) ABSTRACT

A method, implementable in a resonator fiber optic gyroscope (RFOG) having a first wave generator configured to produce a first resonance-detection modulating signal at a fundamental resonance frequency, includes generating with at least a second wave generator a second modulating signal at an even harmonic of the first modulating signal. The second signal is amplitude-modulated (AM) at a frequency that is harmonically unrelated to the first signal. The first signal is added to the second signal with a summing element to produce a resonator output bias error signal. An optimum amplitude is determined from the error signal. Subsequently, the amplitude of the first signal is controlled to the optimum amplitude.

15 Claims, 4 Drawing Sheets

DETERMINATION OF OPTIMUM MODULATION AMPLITUDE TO SUPPRESS MODULATION-DISTORTATION-INDUCED ROTATION SENSING ERRORS IN A FIBER OPTIC GYROSCOPE

BACKGROUND OF THE INVENTION

The resonator fiber optic gyroscope (RFOG) has potential fulfilling needs across many gyro and inertial navigation markets because of its high performance in a small size and at low cost. FIG. 1 illustrates a conventional RFOG 10 consisting of a clockwise (CW) laser 12, a counter-clockwise (CCW) laser 14, a fiber optic resonator 16 and electronic circuits ("electronics") providing at least resonator-coupling and resonance-tracking (or resonance-detection) functionality. The CW laser 12 inputs light into the resonator 16 and a CW photodetector 18 detects the CW output of the resonator.

The electronics downstream of the CW photodetector 18, which include a CW modulation generator 20, a CW demodulator 22, a CW integrator 24, and a summing element 26, control the CW laser frequency to a resonance frequency of the resonator 16. The resonance frequency is detected by modulating the laser frequency at $f_1$ using the CW modulation generator 20 and then demodulating the output of the CW photodetector 18 at $f_1$ using the CW demodulator 22. At the resonance frequency, the CW photodetector 18 signal at $f_1$ passes through zero amplitude. The CW integrator 24 controls the laser frequency via the CW laser driver 38 to the resonance frequency by adjusting the laser frequency until the output of the CW demodulator 22 is zero. The modulation at $f_1$ is electronically summed with the CW integrator 24 output by the summing element 26. The CCW laser 14 is controlled to the CCW resonance frequency in a similar manner, except it is common that the modulation frequency $f_2$ is different than $f_1$ to eliminate errors that arise when light from one direction of propagation in the resonator 16 inadvertently couples into the other direction.

One major limitation of RFOG performance comes from distortion of a modulation required for rotation sensing. The IFOG has a unique property called the eigenfrequency, at which rotation sensor errors due to modulation distortion diminish to zero. The RFOG does not have an equivalent eigenfrequency. Ultra low distortion electronics help, but are typically not good enough to meet distortion-limiting requirements.

SUMMARY OF THE INVENTION

In an embodiment, a method, implementable in a resonator fiber optic gyroscope (RFOG) having a first wave generator configured to produce a first resonance-detection modulating signal at a fundamental resonance frequency, includes generating with at least a second wave generator a second modulating signal at an even harmonic of the first modulating signal. The second signal is amplitude-modulated (AM) at a frequency that is harmonically unrelated to the first signal. The first signal is added to the second signal with a summing element to produce a resonator output bias error signal. An optimum amplitude is determined from the error signal. Subsequently, the amplitude of the first signal is controlled to the optimum amplitude.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
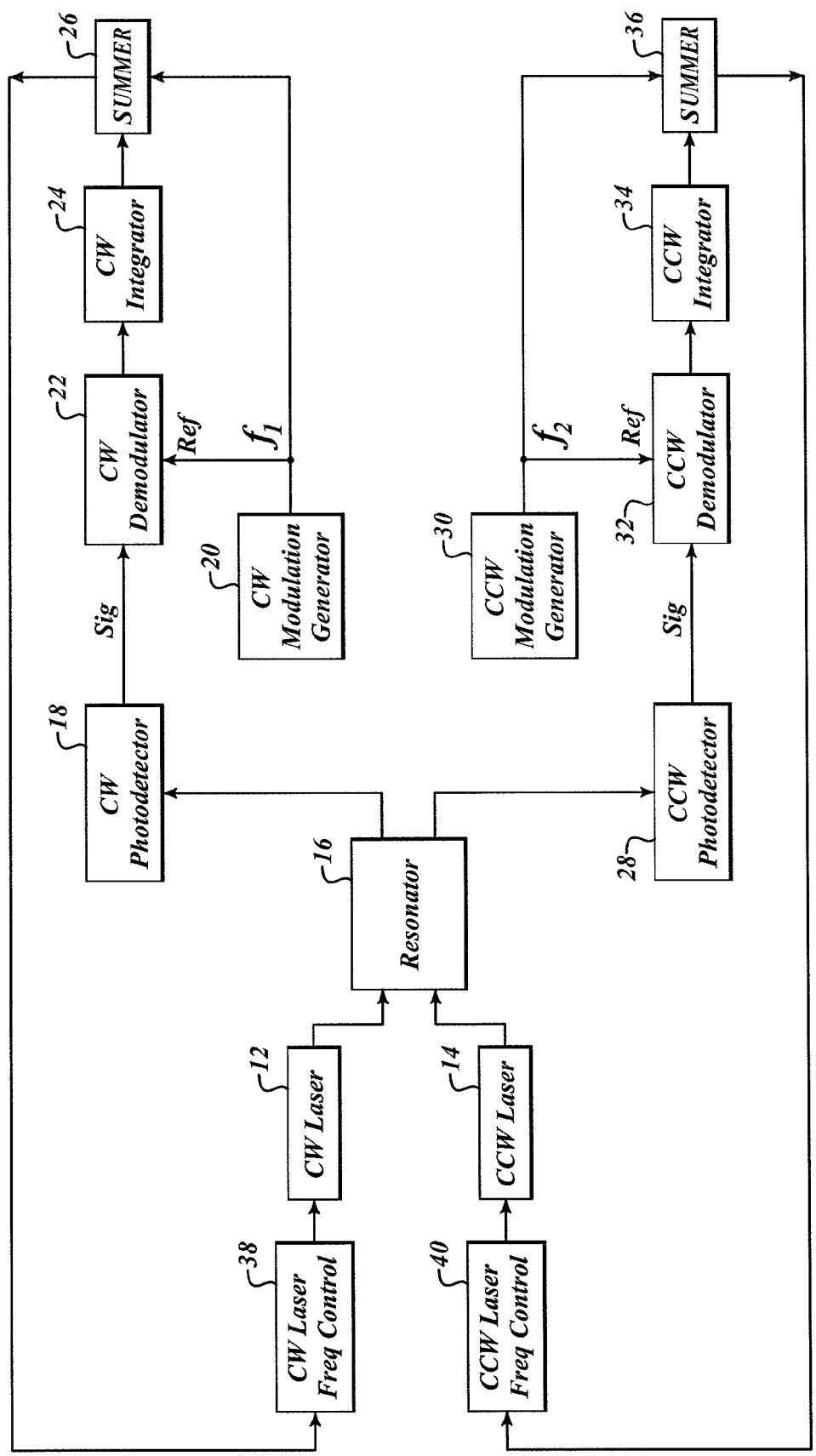
FIG. 1 illustrates a convention RFOG.

In an embodiment, the resonance tracking modulation can be set to a special, or optimum, amplitude where rotation sensing errors due to modulation distortion diminish to zero. The following analytical derivation is provided to demonstrate this principle. The resonance function is simplified with a polynomial; a perfectly symmetric resonance function is assumed, with only even orders in polynomial. As shown in Eq. 1, a fourth order polynomial with a minus sign is employed to approximate a resonance function that has a second derivative that changes sign:

$$y = k_2 x^2 - k_4 x^4 \qquad (1)$$

Modulation at the fundamental frequency and a second harmonic yields:

$$x = a_1 \sin(\omega t) + a_2 \cos(2\omega t) \qquad (2)$$

The component of y that oscillates at the fundamental frequency is given at Eq. 3. This is the resonator output signal at the fundamental frequency, assuming sine wave demodulation:

$$y|_\omega = -k_2 a_1 a_2 \sin(\omega t) + 2k_4 a_1^3 a_2 \sin(\omega t) \qquad (3)$$

The signal represented by Eq. 3 is a bias error since the modulation is set to be centered with the resonance function. The bias error goes to zero when the amplitude of the modulation is:

$$a_1 = \sqrt{\frac{k_2}{2k_4} - \frac{3a_2^2}{4}} \qquad (4)$$

Eq. 4 represents the optimum amplitude. The optimum amplitude has a small dependence on the second harmonic modulation amplitude. However, the second harmonic modulation amplitude can be made very small compared to the modulation amplitude at the fundamental frequency. For small second harmonic modulation amplitudes, the following is a very good approximation:

$$a_1 \approx \sqrt{\frac{k_2}{2k_4}} \qquad (5)$$

$$a_2 \ll a_1$$

However, over time, this optimum amplitude may drift due to environmental changes and aging of the gyro components. There is a need to determine the optimum amplitude during normal gyro operation so that the modulation amplitude can be maintained at the optimum amplitude.

In an embodiment of the invention, by employing certain modulation and demodulation processes, an error signal is created that is indicative of deviations away from the optimum resonance tracking modulation amplitude for zero rotation errors due to distortion. The error signal then can be used by a servo, for example, to control the resonance tracking modulation amplitude to the optimum value.

An embodiment of the invention involves adding to the primary resonance tracking modulation signal an amplitude modulated signal that is at an even harmonic of the primary modulation signal. This creates an error signal in the gyro rate output with a frequency of the amplitude modulation and an amplitude that is indicative of deviations away from the optimum resonance tracking modulation amplitude. A servo uses the error signal to control the amplitude of the resonance tracking modulation to the optimum amplitude by driving the error signal to zero.

Embodiments of the invention may be described in the general context of computer-executable instructions, such as program modules, executed by one or more computer processors or other devices. Generally, program modules include routines, programs, objects, components, data structures, etc. that perform particular tasks or implement particular abstract data types. Typically the functionality of the program modules may be combined or distributed as desired in various embodiments.

Figure 2:
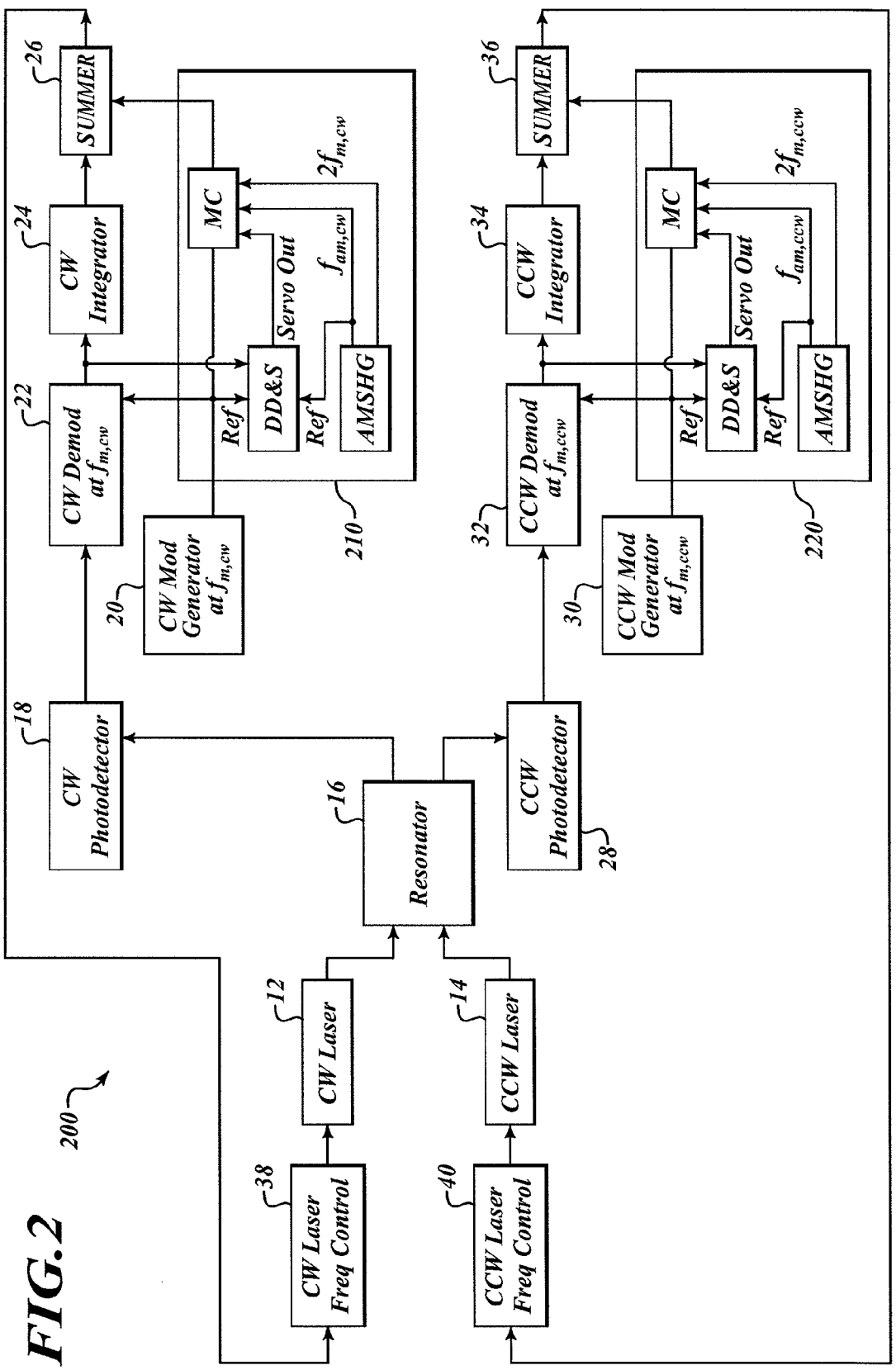
FIG. 2 illustrates an RFOG according to an embodiment of the invention.

FIG. 2 illustrates an RFOG 200 according to an embodiment of the invention. Elements of the RFOG 200 illustrated in FIG. 2 similar or identical to those elements illustrated in FIG. 1 are designated with like reference numerals. The RFOG illustrated in FIG. 2 may include or otherwise utilize at least some form of computer readable media, which may be associated with one or more processors and/or memory devices. Computer readable media can be any available media that can be accessed by one or more components of such operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by one or more components of such operating environment. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Figure 3:
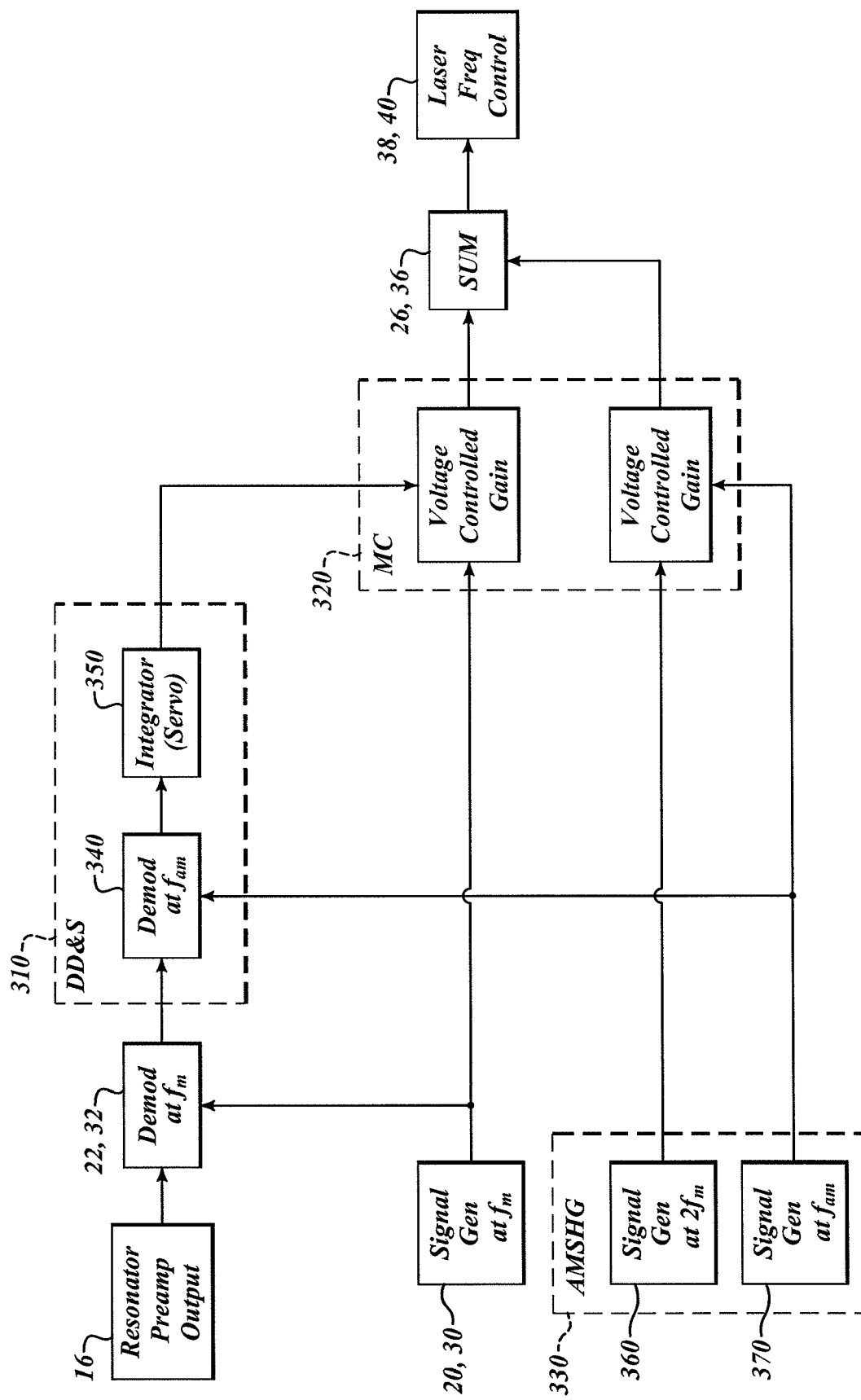
FIG. 3 illustrates components of the RFOG of FIG. 2.

Referring to FIGS. 2 and 3, an embodiment includes respective error-control circuits 210, 220 employed in the CW and CCW paths of the RFOG 200. Each of the circuits includes a distortion-detection and servo (DD&S or DDS) component 310, a modulation-control (MC) component 320 and an amplitude-modulated second-harmonic-generator (AMSHG) component 330.

For ease of illustration, the following discussion is presented in the context of the CW path and its constituent elements illustrated in FIG. 2. It is to be understood that the same or similar principles apply equally to the CCW path illustrated in FIG. 2, as well as the CCW paths illustrated in FIG. 4. As best illustrated in FIG. 3, the AMSHG component 330 is configured to inject a small modulation signal at the second harmonic of the resonance tracking modulation signal generated by CW modulation generator 20 and amplitude modulated at a frequency that is not harmonically related to the resonance tracking modulation. The AMSHG component 330 may include independent generator elements 360, 370 to provide the respective components of the injected signal. This injected signal is, along with the signal generated by CW modulation generator 20, amplified by gain elements associated with the MC component 320 and summed by summing element 26. The resultant signal is given in Eq. 6:

$$x = a_1 \sin(\omega t) + a_2 \cos(2\omega t) + a_3 \sin(\omega_{am} t)\cos(2\omega t) \quad (6)$$

where the first right-hand term is the intended modulation at the fundamental frequency $f_1$, the second term is the unintended modulation at the second harmonic of the fundamental frequency, and the third term is the intended AM modulated signal at the second harmonic.

The component of y that oscillates only at the fundamental frequency is given at Eq. 7. This is the resonator output signal (bias error) at the fundamental frequency:

$$y|_\omega = \left\{ -k_2 a_1 a_2 + 2k_4 a_1^3 a_2 + \frac{3}{2}k_4 a_1 a_2^3 + \frac{9}{4}k_4 a_1 a_2 a_3^2 \right\} \sin(\omega t) \quad (7)$$

If the CW laser 12 frequency is exactly on resonance, and the resonance tracking feedback loop is opened by disconnecting CW integrator 24 output from the corresponding input to summer 26, then CW demodulator 22 will output a DC signal that is proportional to the amplitude of the signal shown in Eq. 7. Then, if the resonance tracking loop is closed by connecting the CW integrator 24 output to the summer 26, the integrator will generate a signal that will control the CW laser slightly off resonance such that the intended resonance tracking modulation over one side of the resonance peak will generate a signal having an amplitude that is equal and opposite to the amplitude shown in Eq. 7, thus canceling the signal shown in Eq. 7 and resulting in a null at the demodulator 22 output. The frequency deviation away from the resonance frequency will result in rate bias error that is proportional to the amplitude of the signal shown in Eq. 7.

The amplitude-modulated second harmonic modulation signal applied by the AMSHG component 330 that is combined with the resonance tracking modulation signal at the modulation control component 320, passes through the summer 26, and to the CW laser CW frequency control 38, which modulates the laser frequency. The laser frequency has a modulation component at an amplitude-modulated second harmonic frequency modulation. Laser light with this frequency modulation component passes through the resonator, which produces a resonator optical output signal that occurs at the resonance tracking modulation frequency with an amplitude modulation at the angular frequency of $\omega_{am}$. The CW photodetector 18 converts the resonator optical output to a voltage signal that is demodulated by the demodulator 22. The signal input to demodulator 22 resulting from the combination of the intended amplitude-modulated second harmonic signal, the unintended second harmonic distortion modulation and the resonance tracking modulation that oscillates at the modulation frequency and is amplitude modulated at the AM frequency is:

$$y|_{\omega \pm \omega_{am}} = \left\{ \begin{array}{l} -k_2 a_1 a_3 + 2k_4 a_1^3 a_3 + \\ \frac{9}{4} k_4 a_1 a_2^2 a_3 + \frac{9}{8} k_4 a_1 a_3^2 \end{array} \right\} \sin(\omega_{am} t)\sin(\omega t) \quad (8)$$

This signal of Eq. 8 is first demodulated at the resonance tracking modulation frequency by CW demodulator 22 and then demodulated again at the AM frequency by an AM demodulator 340 associated with DDS component 310. The output of the second demodulator 340 will be a DC signal that is proportional to the amplitude of the signal shown in Eq. 8.

If the unintended and intended second harmonic modulation amplitudes are assumed to be very small compared to the resonance tracking modulation amplitude, the higher order terms can be neglected, such that:

$$y|_\omega \approx \{-k_2 a_1 a_2 + 2k_4 a_1^3 a_2\} \sin(\omega t) \quad (9)$$

$$y|_{\omega \pm \omega_{am}} = \{-k_2 a_1 a_3 + 2k_4 a_1^3 a_3\} \sin(\omega_{am} t)\sin(\omega t) \quad (10)$$

where Eq. 9 represents the bias error from the unintended second harmonic modulation, and Eq. 10 represents the bias error from the intended second harmonic modulation.

The two bias error signals go to zero at the same resonance tracking modulation amplitude (i.e., optimum amplitude):

$$y|_m = 0 \text{ when } a_1 = \sqrt{\frac{k_2}{2k_4}}$$

$$y|_{\omega \pm \omega_{am}} = 0 \text{ when } a_1 = \sqrt{\frac{k_2}{2k_4}}$$

when $a_2 \ll a_1$, $a_3 \ll a_1$

A servo element 350 associated with the DDS component 310 is configured to determine this optimum amplitude from the error function represented in Eq. 10, and set the amplitude of the resonance tracking signal to this optimum amplitude. As such, the servo element 350 functions to control the amplitude of the resonance tracking modulation by controlling to zero the error signal due to the AM second harmonic modulation, which results in the bias error due to the unintended second harmonic modulation being controlled to zero.

Figure 4:
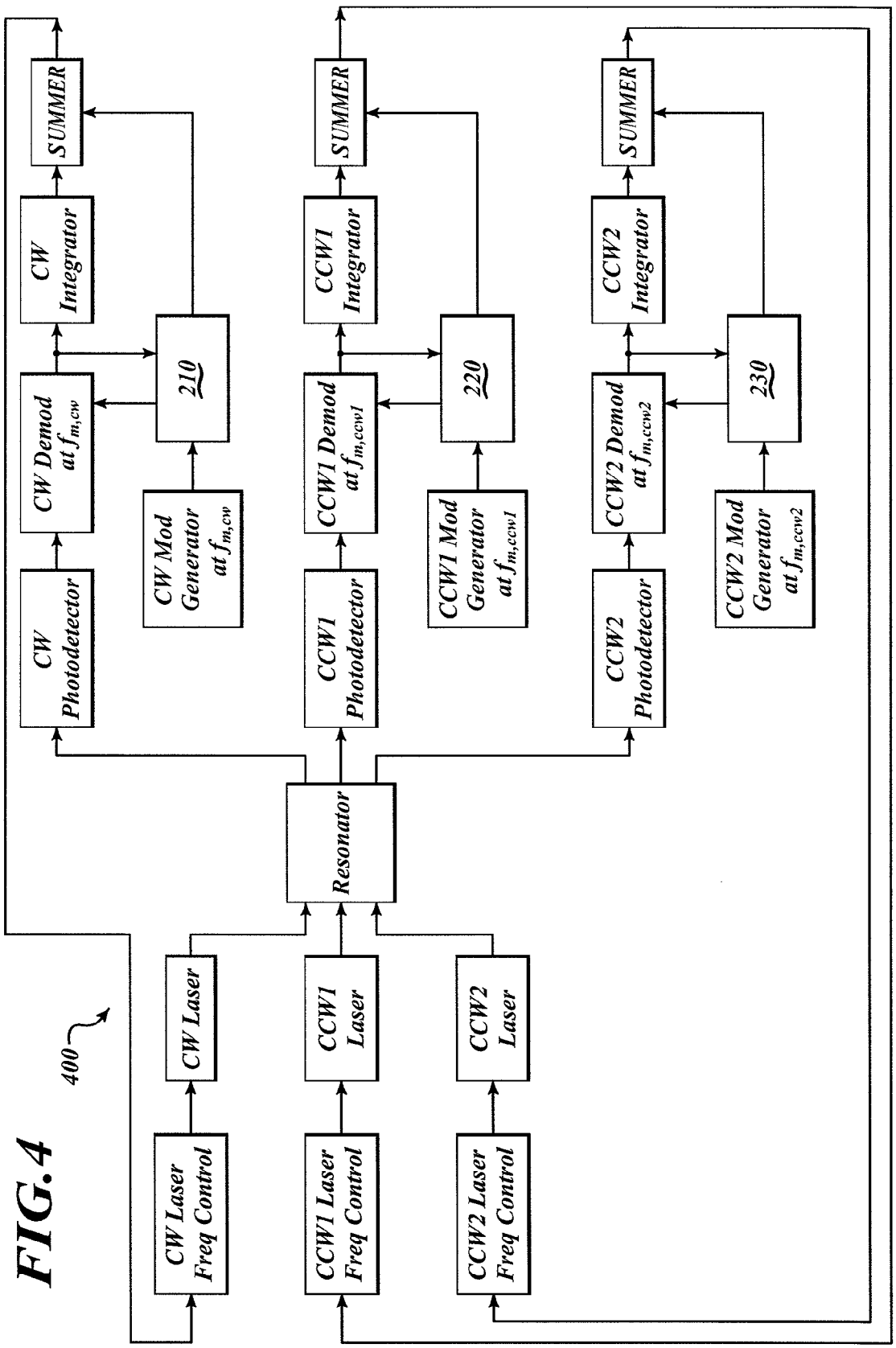
FIG. 4 illustrates an RFOG according to an alternative embodiment of the invention.

FIG. 4 illustrates an alternative embodiment RFOG 400 including a CCW path additional to, but otherwise similar to, that of the RFOG 200 illustrated in FIG. 2. The RFOG 400 includes error-control circuits 210, 220, 230, similar or identical in functionality to those illustrated in and described with reference to FIG. 2, respectively incorporated within the CW and CCW paths of RFOG 400. For the configuration shown in FIG. 4, a third laser is added to implement a scheme for eliminating backscatter errors. Details of this scheme can be found in U.S. Pat. No. 7,372,574, which is incorporated herein by reference.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method implementable in a resonator fiber optic gyroscope (RFOG) having a first wave generator configured to produce a first resonance-detection modulating signal at a fundamental frequency, the method comprising the steps of:
   generating with at least a second wave generator a second modulating signal at an even harmonic of the first modulating signal, the second signal being amplitude-modulated;
   adding with a summing element the first signal to the second signal to produce a resonator output bias error signal;
   determining an optimum amplitude from the error signal; and
   setting the amplitude of the first signal to the optimum amplitude.

2. The method of claim 1, further comprising the steps of:
   prior to determining the optimum amplitude, demodulating the error signal at the first-signal frequency; and
   prior to determining the optimum amplitude, demodulating the error signal at the second-signal frequency.

3. The method of claim 2 wherein the error signal is demodulated at the first-signal frequency prior to demodulating the error signal at the second-signal frequency.

4. The method of claim 1 wherein the even harmonic comprises the second harmonic.

5. The method of claim 1 wherein the second modulating signal comprises:
   a third signal at the even harmonic of the first modulating signal and generated by the second wave generator; and
   a fourth signal modulated at the frequency that is harmonically unrelated to the first signal and generated by a third wave generator.

6. The method of claim 1, further comprising, prior to adding the first and second signals, amplifying the first and second signals.

7. The method of claim 1 wherein the amplitude of the first signal is set to the optimum amplitude by a servo element.

8. The method of claim 1, wherein the second signal is amplitude-modulated at a frequency that is harmonically unrelated to the first signal.

9. An error-control circuit implementable in a resonator fiber optic gyroscope (RFOG), the RFOG including a first wave generator configured to produce a first resonance-detection modulating signal at a fundamental resonance frequency, the circuit comprising:
   at least a second wave generator configured to generate a second modulating signal at an even harmonic of the first modulating signal and provide the second signal to a summing element configured to sum the first and second signals, the second signal being amplitude-modulated (AM) at a frequency that is harmonically unrelated to the first signal; and
   a servo element configured to determine an optimum amplitude from an error signal produced by the summed first and second signals, the servo element further configured to set the amplitude of the first signal to the optimum amplitude.

10. The circuit of claim 9 wherein the error signal is demodulated at the first-signal frequency prior to the optimum amplitude being determined, and further comprising:
   An AM-demodulating element configured to demodulate the error signal at the second-signal frequency prior to the optimum amplitude being determined.

11. The circuit of claim 10 wherein the error signal is demodulated at the first-signal frequency prior to demodulating the error signal at the second-signal frequency.

12. The circuit of claim 9 wherein the even harmonic comprises the second harmonic.

13. The circuit of claim 9 wherein the second modulating signal comprises:
- a third signal at the even harmonic of the first modulating signal and generated by the second wave generator; and
- a fourth signal modulated at the frequency that is harmonically unrelated to the first signal and generated by a third wave generator.

14. The circuit of claim 9, further comprising at least one amplifier configured to amplify the first and second signals prior to adding the first and second signals.

15. A resonator fiber optic gyroscope, comprising:
- a light source;
- a first wave generator configured to produce a first resonance-detection modulating signal at a fundamental resonance frequency;
- at least a second wave generator configured to generate a second modulating signal at an even harmonic of the first modulating signal and provide the second signal to a summing element configured to sum the first and second signals, the second signal being amplitude-modulated (AM) at a frequency that is harmonically unrelated to the first signal; and
- a servo element configured to determine an optimum amplitude from an error signal produced by the summed first and second signals, the servo element further configured to set the amplitude of the first signal to the optimum amplitude.

* * * * *